(12) United States Patent
Suzuki et al.

(10) Patent No.: US 12,710,395 B2
(45) Date of Patent: Aug. 18, 2026

(54) DEAERATOR AND ELECTROLYTE MEASUREMENT SYSTEM

(71) Applicant: Hitachi High-Tech Corporation, Tokyo (JP)

(72) Inventors: Hiroshi Suzuki, Tokyo (JP); Mitsuhiro Hishinuma, Tokyo (JP); Hajime Yamazaki, Tokyo (JP); Koichi Asada, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 814 days.

(21) Appl. No.: 17/628,458

(22) PCT Filed: Feb. 28, 2020

(86) PCT No.: PCT/JP2020/008492
§ 371 (c)(1),
(2) Date: Jan. 19, 2022

(87) PCT Pub. No.: WO2021/024527
PCT Pub. Date: Feb. 11, 2021

(65) Prior Publication Data

US 2022/0268725 A1 Aug. 25, 2022

(30) Foreign Application Priority Data

Aug. 5, 2019 (JP) ................................ 2019-143789

(51) Int. Cl.
*G01N 27/333* (2006.01)
*B01D 19/00* (2006.01)
(Continued)

(52) U.S. Cl.
CPC ....... *G01N 27/333* (2013.01); *B01D 19/0031* (2013.01); *B01D 19/0063* (2013.01);
(Continued)

(58) Field of Classification Search
None
See application file for complete search history.

(56) References Cited

U.S. PATENT DOCUMENTS 4,253,847 A * 3/1981 Matson ............ G01N 33/48714 436/83
5,183,486 A * 2/1993 Gatten ............... B01D 19/0031 73/19.1
(Continued)

FOREIGN PATENT DOCUMENTS

EP 0 193 946 A2 9/1986
JP 2000-99162 * 4/2000 ............... G01N 1/28
(Continued)

OTHER PUBLICATIONS

English language machine translation for JP 2000-99162. Retrieved from patents.google.com on Nov. 1, 2024. (Year: 2024).*
(Continued)

*Primary Examiner* — Dung H Bui
(74) *Attorney, Agent, or Firm* — Crowell & Moring LLP

(57) ABSTRACT

To enable efficient substance measurement, this invention is characterized in that the invention comprises a first hollow fiber (131) for allowing a first processing liquid to flow from a first introduction port (121*a*) to a first exit port (121*b*) and allowing the membrane permeation of gas in the processing liquid, a second hollow fiber (132) for allowing a second processing liquid to flow from a second introduction port (122*a*) to a second exit port (122*b*) and allowing the membrane permeation of gas in the processing liquid, a container (110) for accommodating the first hollow fiber (131) and second hollow fiber (132) therein, and a vacuum pump (201) connected to the space (S) inside the container (110), and inside the container (110), the hollow fibers (130) consisting
(Continued)

of the first hollow fiber (131) and second hollow fiber (132) are in contact with each other across a prescribed length.

2 Claims, 17 Drawing Sheets

(51) Int. Cl.
*B01D 63/02* (2006.01)
*B01D 69/08* (2006.01)
*G01N 1/38* (2006.01)
*G01N 27/416* (2006.01)

(52) U.S. Cl.
CPC ......... *B01D 63/027* (2013.01); *B01D 69/082* (2013.01); *G01N 1/38* (2013.01); *G01N 27/4166* (2013.01); *B01D 2311/1031* (2022.08); *B01D 2311/2653* (2013.01); *B01D 2313/221* (2022.08); *B01D 2315/22* (2022.08)

(56) References Cited

U.S. PATENT DOCUMENTS 5,288,374 A * 2/1994 Watanabe ............ G01N 33/492 204/415
5,340,384 A 8/1994 Sims
2004/0251010 A1* 12/2004 Doh .................... B01D 63/022 165/172
2012/0261260 A1* 10/2012 Li ....................... G01N 27/333 204/416
2015/0000520 A1* 1/2015 Liu ....................... B01D 19/00 96/6
2015/0008122 A1* 1/2015 Thompson ............ G01N 33/49 204/403.01
2016/0054257 A1* 2/2016 Ishige .................. G01N 27/021 205/789
2016/0334428 A1 11/2016 Imai et al.
2018/0147534 A1 5/2018 Lescoche et al.
2018/0238829 A1* 8/2018 Watanabe .......... G01N 27/4166
2019/0265187 A1* 8/2019 Kishioka ................ G01N 35/00
2021/0318260 A1* 10/2021 Ozawa ................. G01N 27/301
2021/0318266 A1* 10/2021 Kishioka .............. G01N 27/333
2021/0322926 A1* 10/2021 Baumeister ........ B01D 63/0224
2022/0026387 A1* 1/2022 Miyake .................. G01N 35/08
2022/0088505 A1* 3/2022 Cronin ............... B01D 19/0042
2022/0187235 A1* 6/2022 Watanabe ............ G01N 27/413

FOREIGN PATENT DOCUMENTS

JP 2000-99162 A 4/2000
JP 2005-62128 A 3/2005
JP 2005-305443 A 11/2005
JP 2017-156089 * 9/2017 ............. G01N 27/26
JP 2017-156089 A 9/2017
WO WO 2015/111441 A1 7/2015
WO WO 2019/016186 A1 * 1/2019 ........... B01D 69/082

OTHER PUBLICATIONS

English language machine translation for JP 2017-156089. Retrieved from translationportal.epo.org on Nov. 4, 2024. (Year: 2024).*
English language machine translation for WO 2019/016186 A1. Retrieved from translationportal.epo.org on Jan. 23, 2025. (Year: 2025).*
Nijdam, W et al., "High performance micro-engineered hollow fiber membranes by smart spinneret design", Journal of Membrane Science, 256, 2005, pp. 209-215. (Year: 2005).*
International Search Report (PCT/ISA/210) issued in PCT Application No. PCT/JP2020/008492 dated Apr. 21, 2020 with English translation (four (4) pages).
Japanese-language Written Opinion (PCT/ISA/237) issued in PCT Application No. PCT/JP2020/008492 dated Apr. 21, 2020 (six (6) pages).
Japanese-language International Preliminary Report on Patentability (PCT/IPEA/416 & PCT/IPEA/409) issued in PCT Application No. PCT/JP2020/008492 dated Aug. 13, 2021 (12 pages).
Chinese-language Office Action issued in Chinese Application No. 202080051826.4 dated Jan. 17, 2024 with English translation (20 pages).
European Office Action issued in European Application No. 20849126.6 dated Jun. 6, 2025 (5 pages).

* cited by examiner

[FIG. 1]
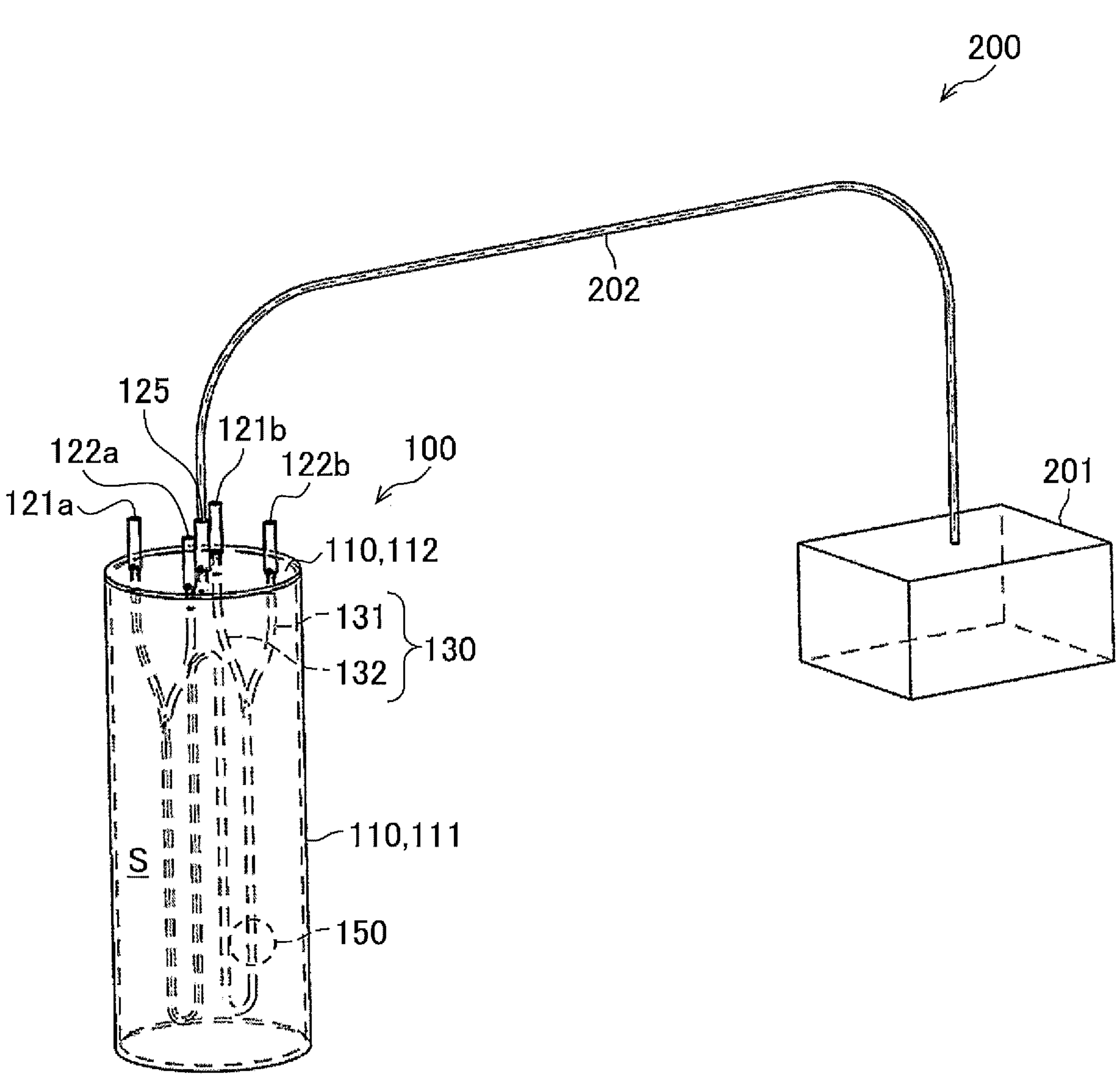

[FIG. 2]
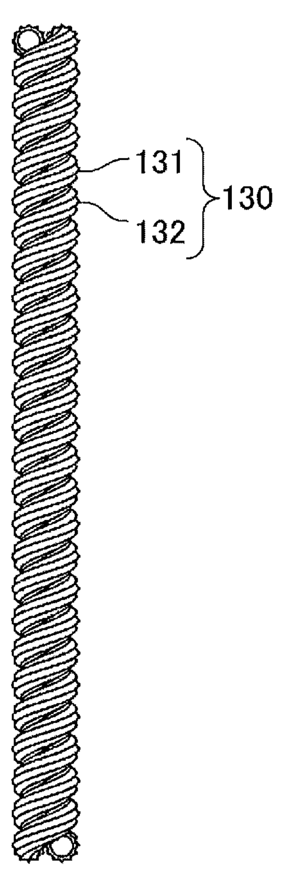

[FIG. 3]
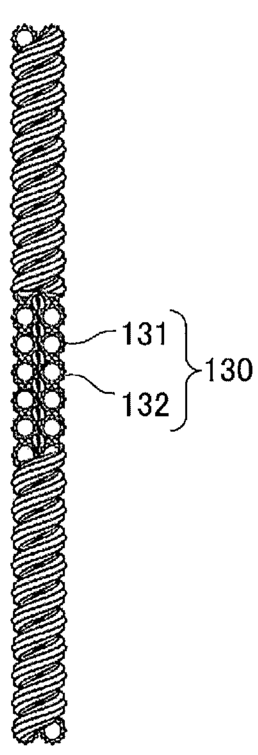

[FIG. 4]
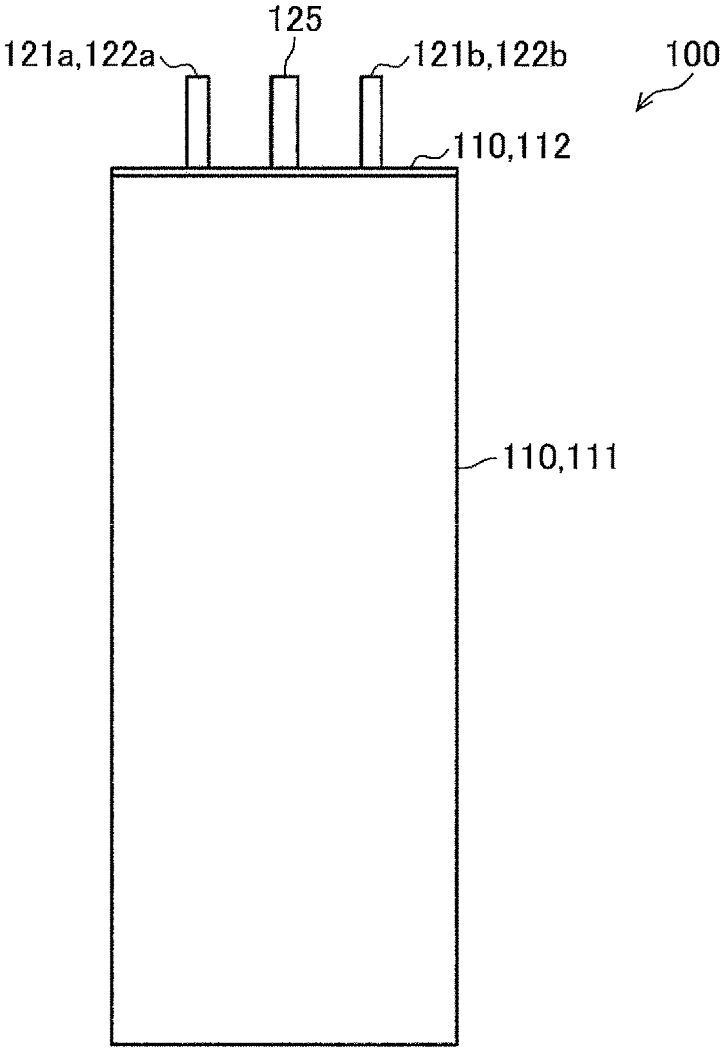
[FIG. 5]
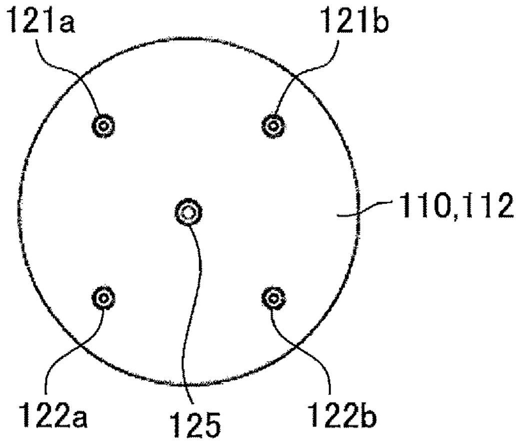

[FIG. 6]
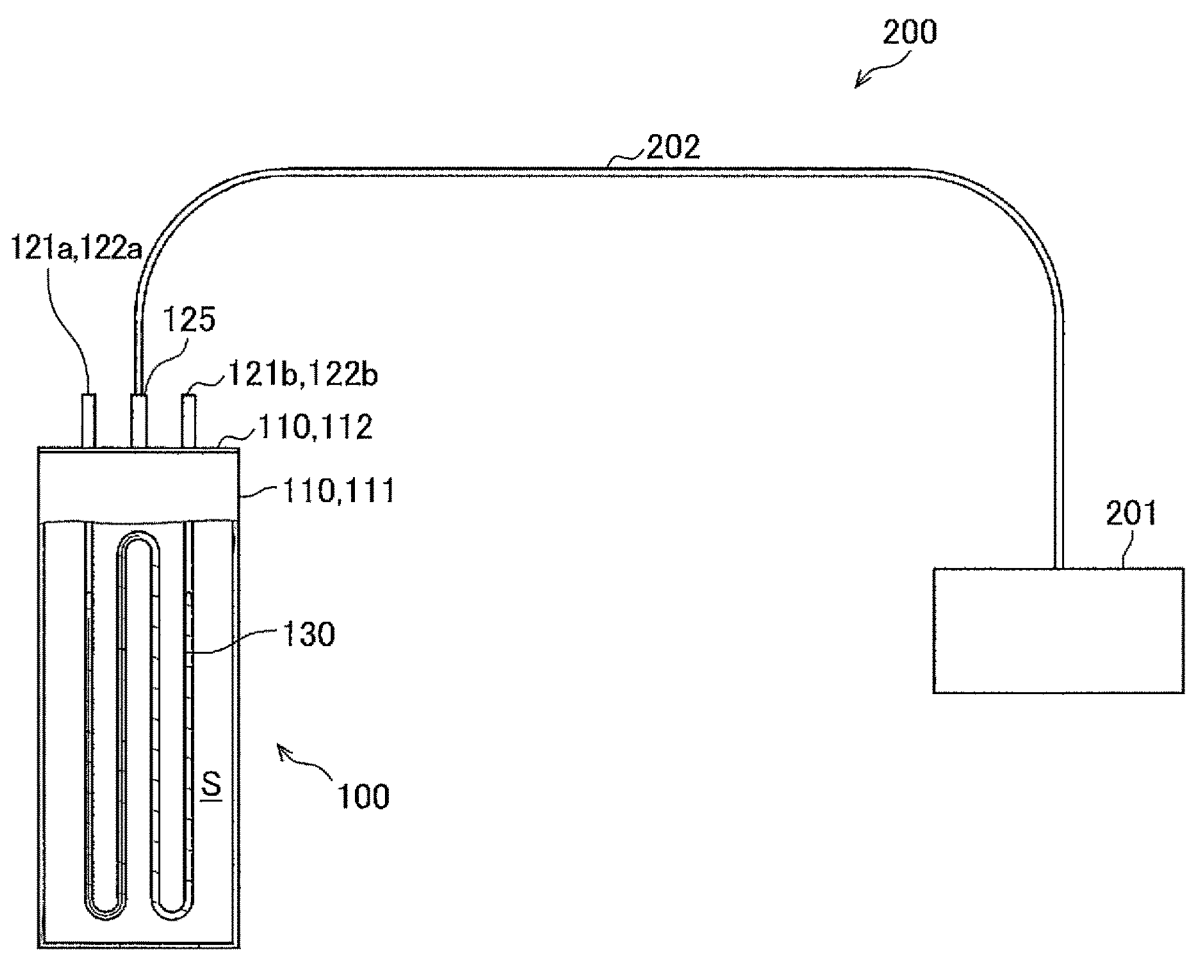

[FIG. 7]
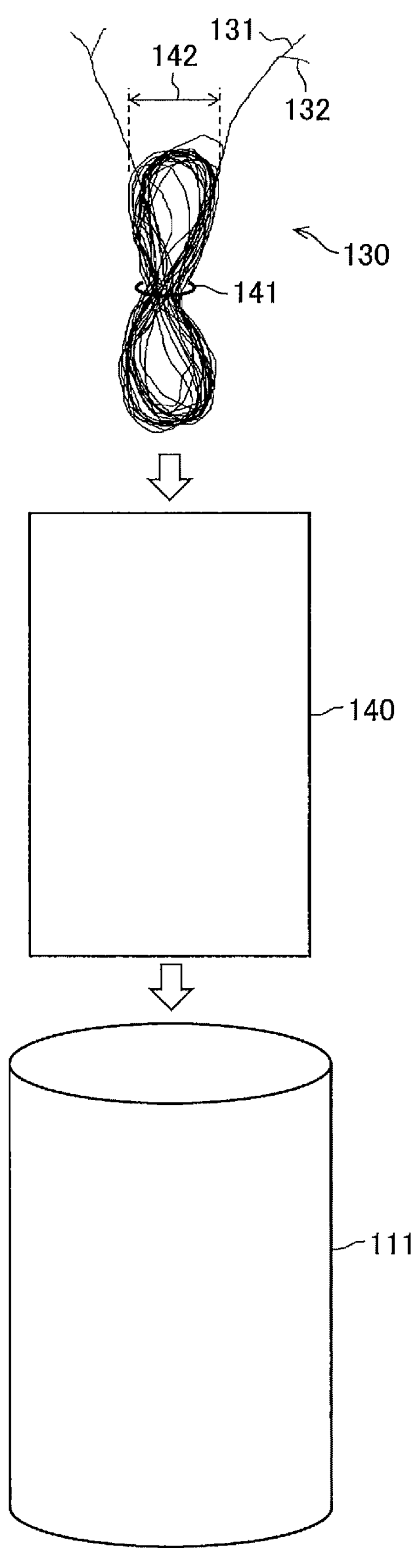

[FIG. 8]
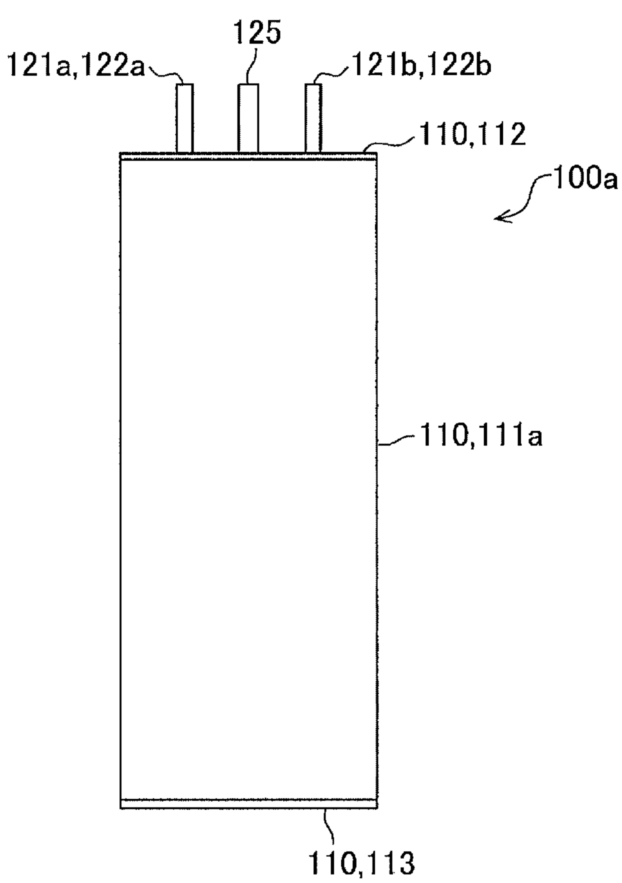

[FIG. 9]
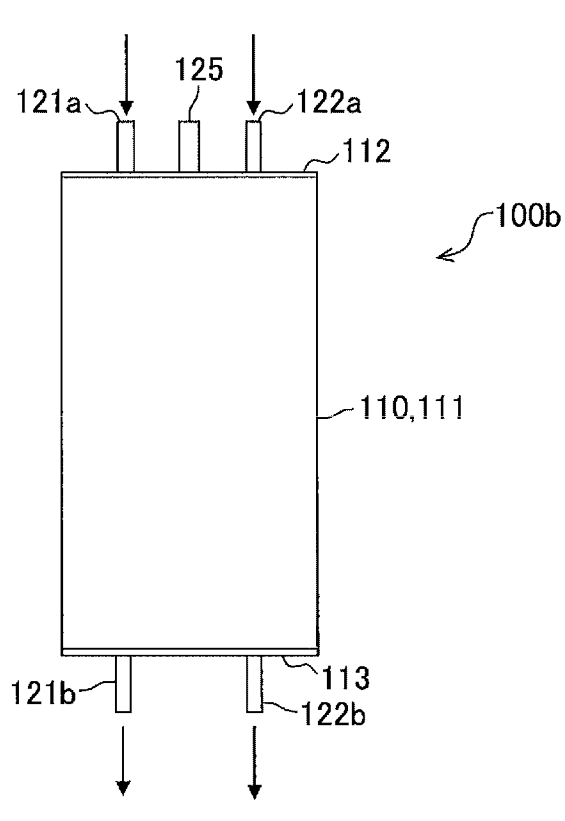

[FIG. 10]
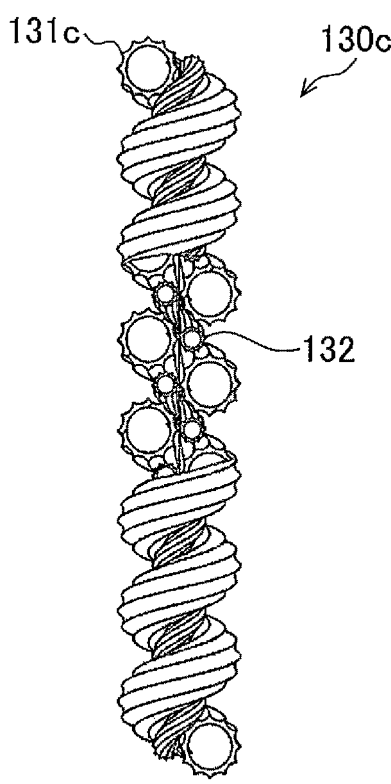

[FIG. 11]
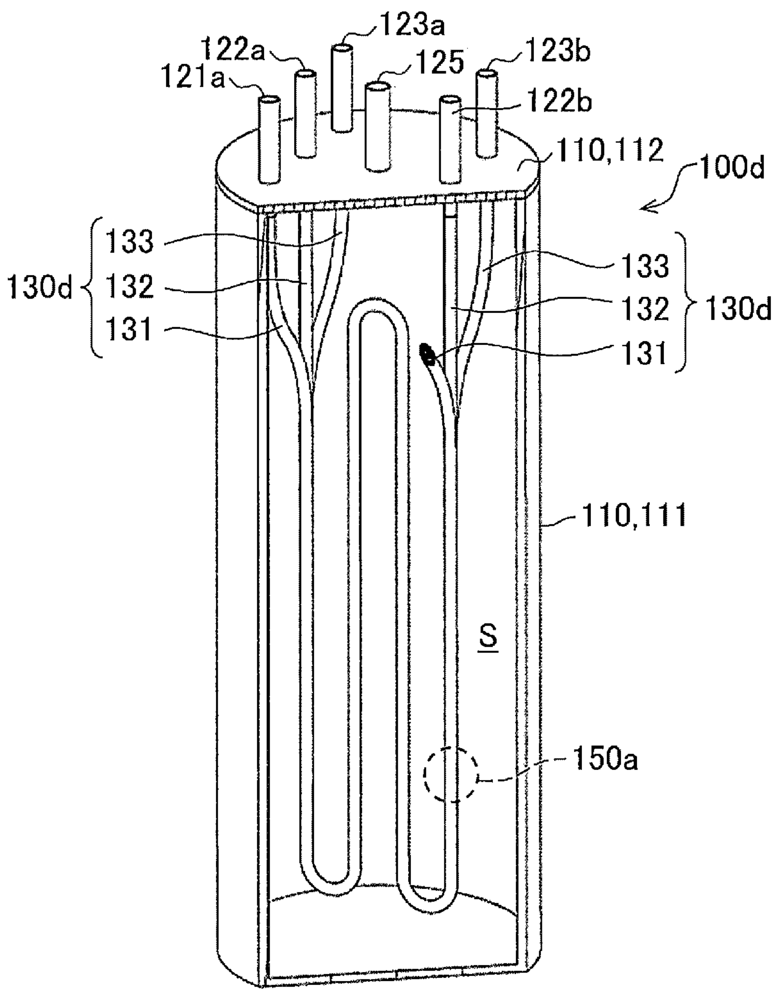
[FIG. 12]
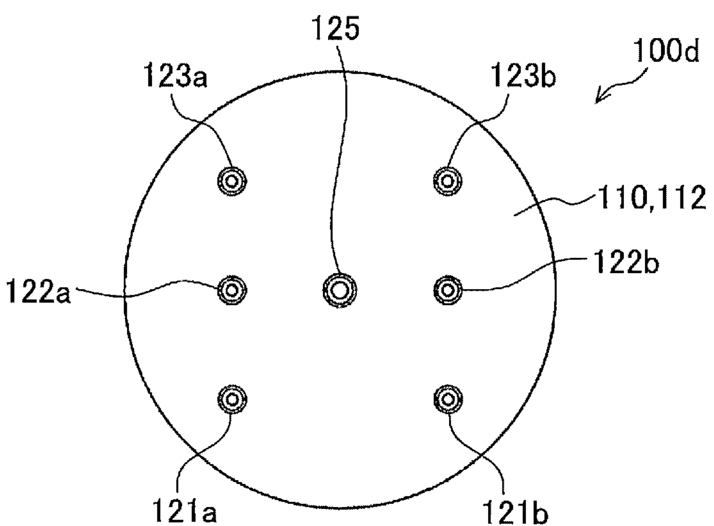

[FIG. 13]
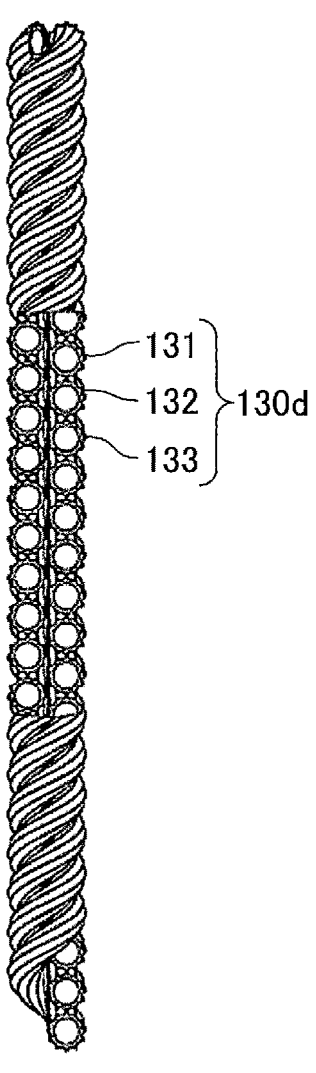

[FIG. 14]
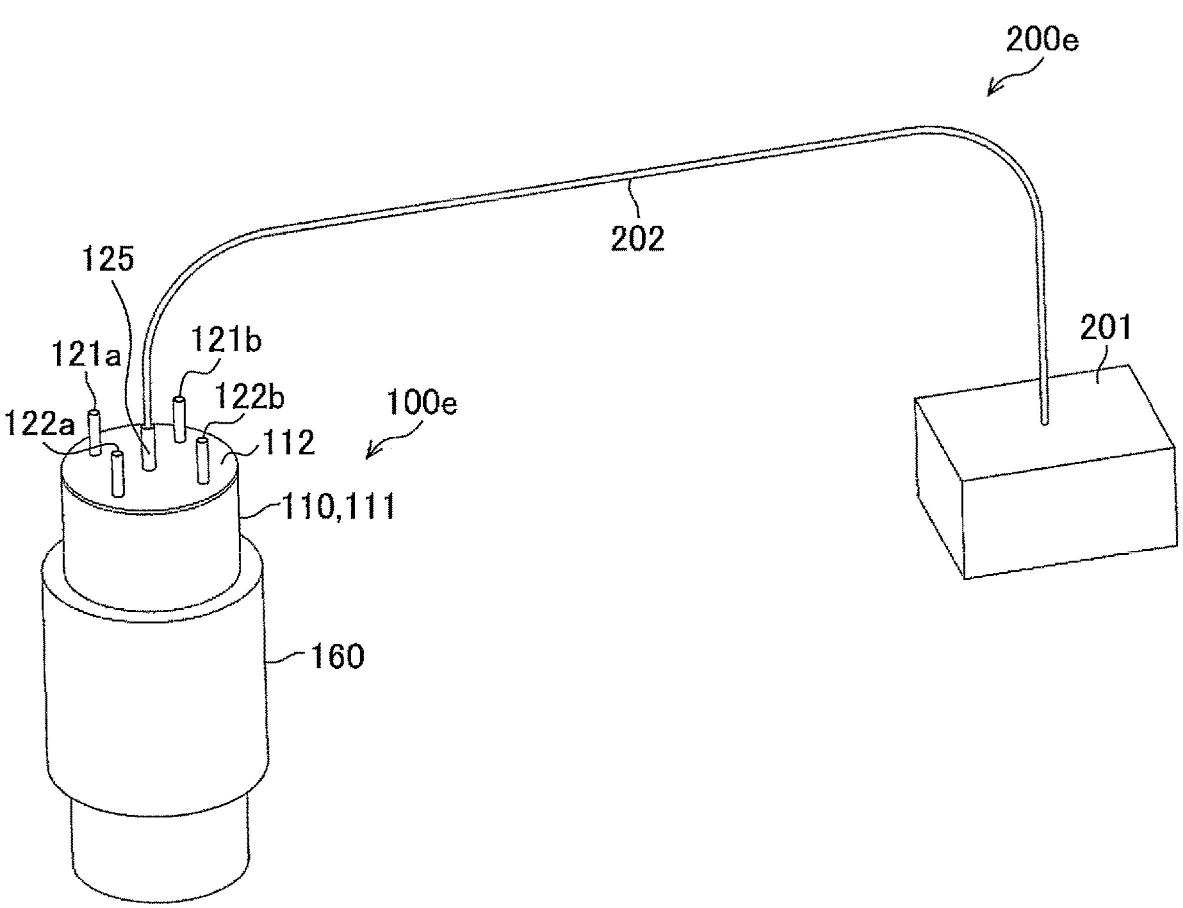

[FIG. 15]
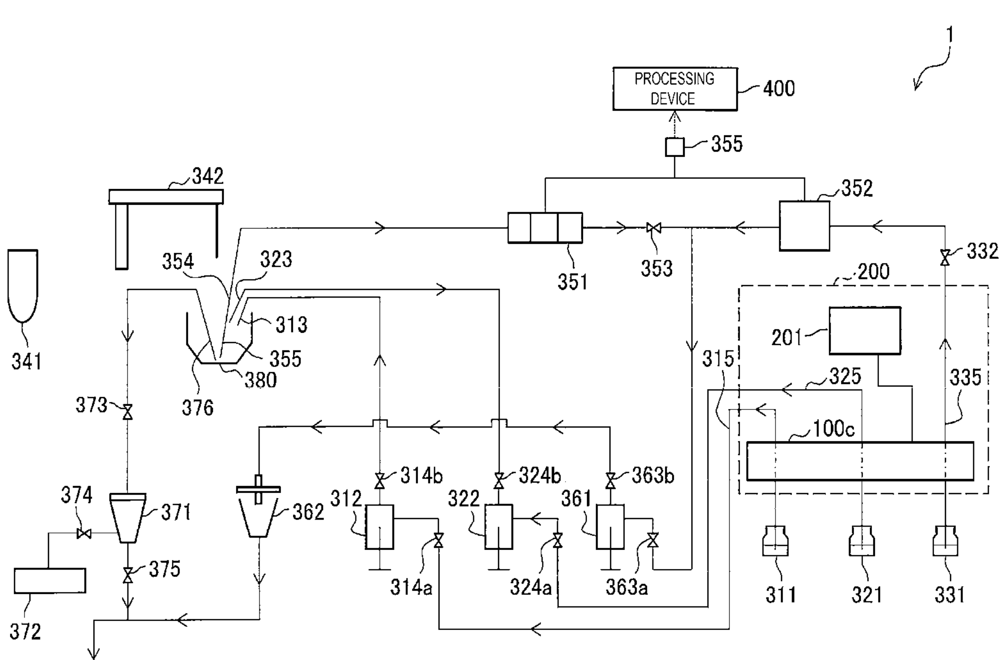

[FIG. 16]
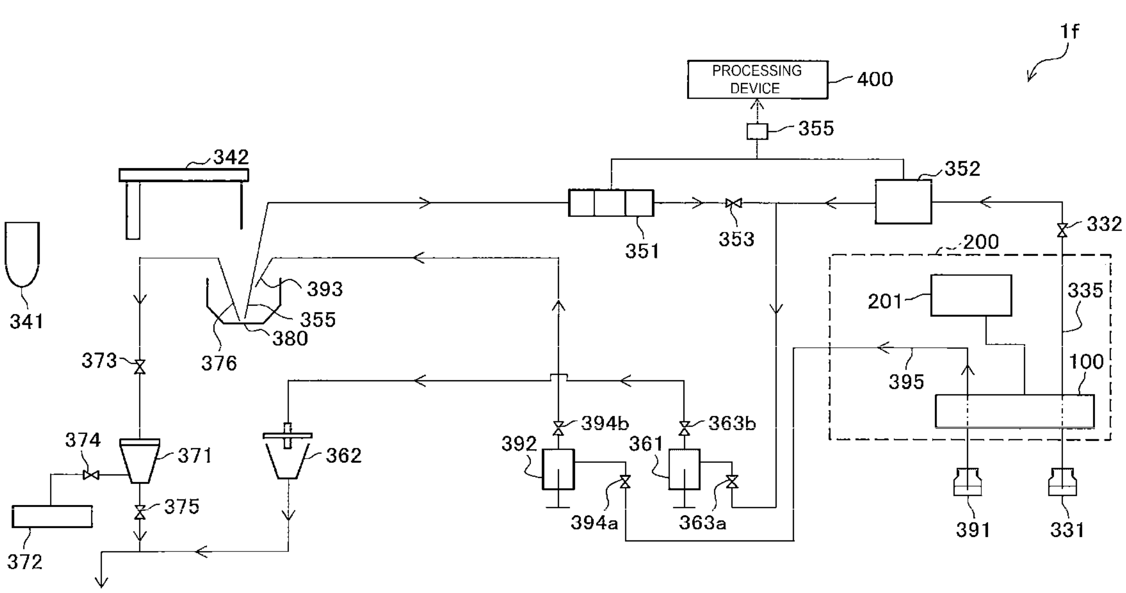

[FIG. 17]
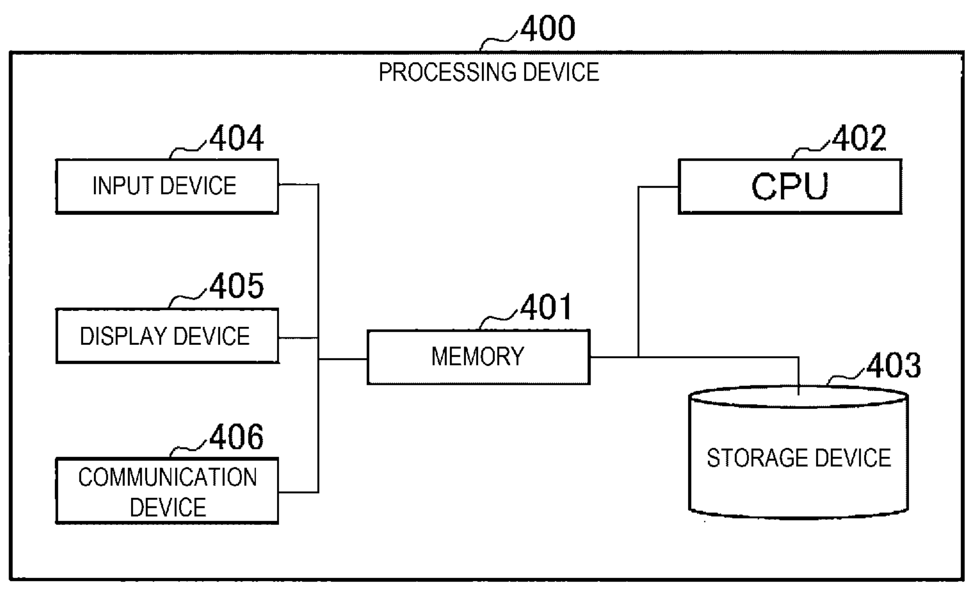

[FIG. 18]
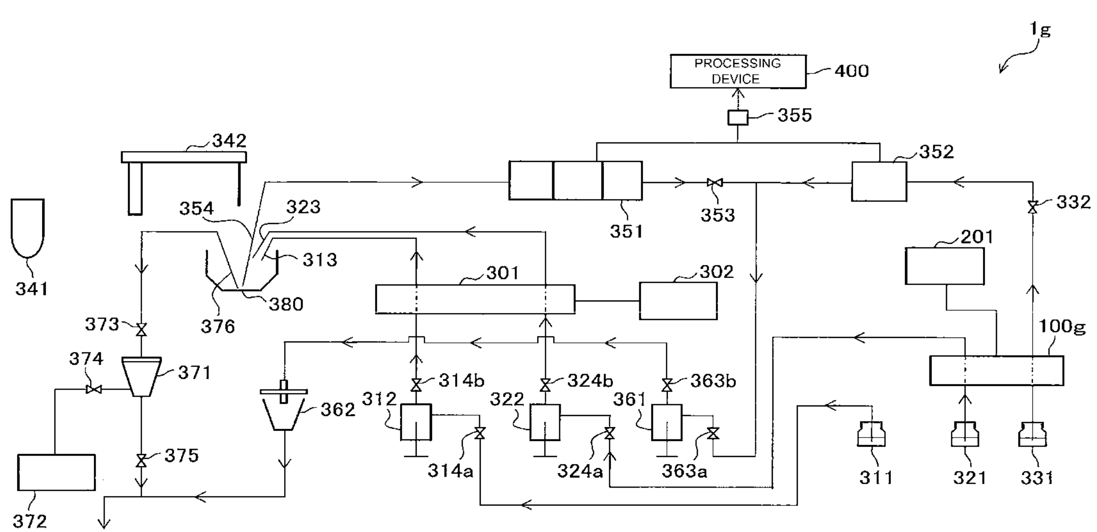

[FIG. 19]
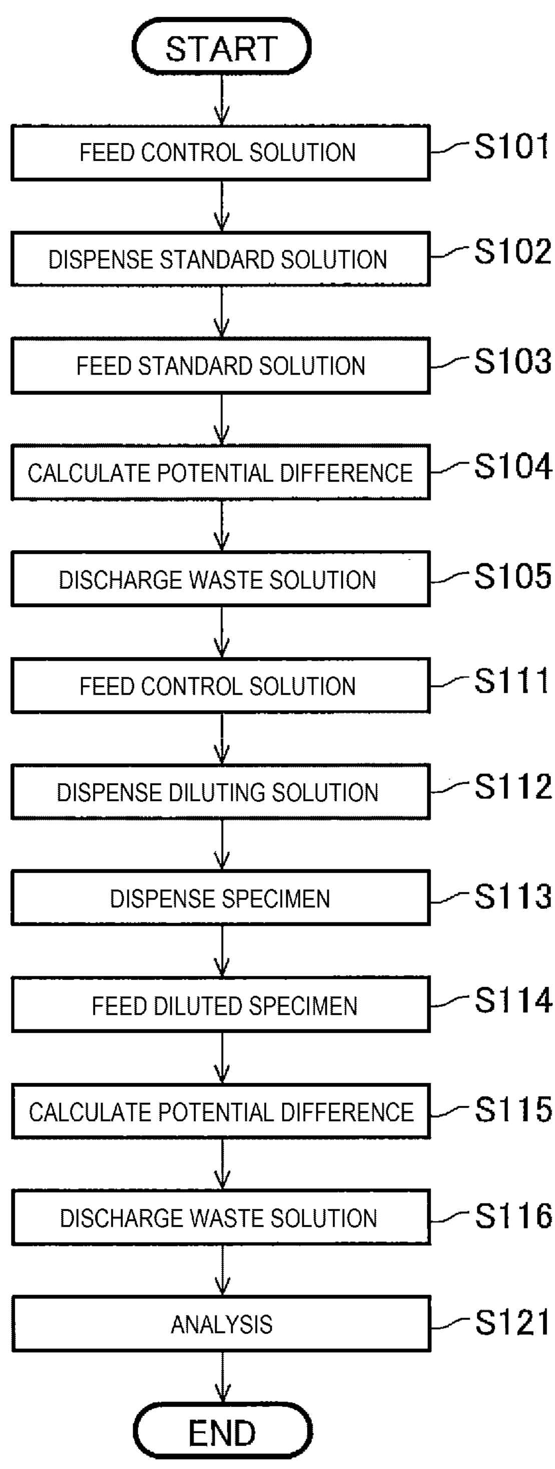

DEAERATOR AND ELECTROLYTE MEASUREMENT SYSTEM

TECHNICAL FIELD

The present invention relates to a deaerator and an electrolyte measurement system.

BACKGROUND ART

In the related art, in physics and chemistry analyzers, especially in blood analyzers for clinical examinations, in order to improve dispensing accuracy of samples, reagents, and the like, it is common practice to separate (deaerate) a dissolved gas in a solution by a deaerator or the like. This is because, for example, in the blood analyzers, if volume suddenly changes in a movable unit such as a syringe or a solenoid valve, the dissolved gas in the solution evaporates and the dispensing accuracy deteriorates.

PTL 1 discloses an electrolyte analyzer "including a diluting solution supply unit configured to supply a diluting solution for diluting a sample to generate a sample solution to a dilution container, a standard solution supply unit configured to supply a standard solution to the dilution container, and a measurement unit configured to measure an electrolyte concentration of a component to be measured contained in the sample solution by measuring electromotive forces of the sample solution and standard solution using an ion-selective electrode, the electrolyte analyzer comprising a heat exchange unit configured to exchange heat between the diluting solution supplied by the diluting solution supply unit and the standard solution supplied by the standard solution supply unit" (see claim 1).

PTL 2 discloses a temperature controller used in an analytical apparatus "used for adjusting, by bundling and bringing in contact one or more temperature-controlled tubes 1 for circulating a temperature-controlled object together with one or more temperature-controlling tubes 2 for circulating a temperature-controlling object, the temperature-controlled object to a predetermined temperature while circulating the temperature-controlled object in the temperature-controlled tube" (see abstract).

CITATION LIST

Patent Literature

PTL 1: JP-A-2005-62128
PTL 2: JP-A-2000-99162

SUMMARY OF INVENTION

Technical Problem

In the technique described in PTL 1, the electrolyte analyzer including the heat exchange unit between liquids is described, but deaeration is not described.

In the technique described in PTL 2, it is described that heat exchange and deaeration are simultaneously performed, but deaerating a plurality of liquids is not described.

The invention has been made in view of such a background, and an object of the invention is to enable efficient substance measurement without increasing the size of an apparatus by simultaneously performing deaeration and heat exchange of a plurality of liquids.

Solution to Problem

To solve the problem, the invention includes: a first hollow fiber in which a first treatment solution is conducted from a port on one end side to a port on the other end side to cause a gas in the first treatment solution to permeate a membrane; a second hollow fiber in which a second treatment solution is conducted from a port on one end side to a port on the other end side to cause a gas in the second treatment solution to permeate through the membrane; a container configured to house the first hollow fiber and the second hollow fiber inside; and an exhaust mechanism connected to a space in the container, in which over a certain length, the one first hollow fiber and the one second hollow fiber are in contact with each other by being spirally woven.

Other solutions to the problem will be described as appropriate in the embodiments.

Advantageous Effect

According to the invention, by simultaneously performing deaeration and heat exchange of a plurality of liquids, it is possible to execute efficient substance measurement without increasing the size of the apparatus.

BRIEF DESCRIPTION OF DRAWINGS

FIG. 1 is an external diagram of a deaeration system according to a first embodiment.

FIG. 2 is an external diagram of a hollow fiber according to the first embodiment.

FIG. 3 is a partial cross-sectional diagram of the hollow fiber according to the first embodiment.

FIG. 4 is a side diagram of a deaerator according to the first embodiment.

FIG. 5 is a top diagram of the deaerator according to the first embodiment.

FIG. 6 is a side diagram of the deaeration system.

FIG. 7 is a diagram showing a method of mounting the hollow fiber into the deaerator.

FIG. 8 is a diagram showing a modification of the deaerator.

FIG. 9 is a diagram showing a deaerator according to a second embodiment.

FIG. 10 is a diagram showing a hollow fiber according to a third embodiment.

FIG. 11 is a partial cross-sectional diagram cutting out a part of a deaerator according to a fourth embodiment.

FIG. 12 is a top diagram of the deaerator according to the fourth embodiment.

FIG. 13 is a diagram showing a hollow fiber in the deaerator.

FIG. 14 is an external diagram of a deaeration system according to a fifth embodiment.

FIG. 15 is a diagram showing a configuration example of an electrolyte measurement system according to a sixth embodiment.

FIG. 16 is a diagram showing a configuration example of an electrolyte measurement system according to a seventh embodiment.

FIG. 17 is a diagram showing a hardware configuration of a processing device used in the present embodiment.

FIG. 18 is a diagram showing a configuration of a related-art electrolyte measurement system.

FIG. 19 is a flowchart showing a procedure of electrolyte measurement in the related-art electrolyte measurement system.

DESCRIPTION OF EMBODIMENTS

Next, embodiments of the invention (referred to as "embodiments") are described in detail with reference to the drawings appropriately. In the drawings, the same reference numerals are given to the same configurations, and the description thereof will be omitted as appropriate.

[Related-art Electrolyte Measurement System 1*g*]

First, with reference to FIGS. 18 and 19, a related-art electrolyte measurement system 1*g* and an electrolyte measurement method is described, and the problems thereof are described.

In the ion-selective electrode method, the Nernst equation of Equation (1) is used as a basic principle.

$$E=E0+(RT/nF)\log C \quad (1)$$

Here, E is a potential of an ion-selective electrode, E0 is a standard electrode potential, n is a valence of ions involved in a reaction, F is the Faraday constant, R is a gas constant, T is the absolute temperature, and C is an ion concentration of an object to be measured.

The measurement according to the ion-selective electrode method is achieved by measuring a difference between potentials of two electrodes as described below. If the potential of an electrode of the object to be measured is Es and the potential of a reference electrode is ERef, Equations (2) and (3) are satisfied. Thus, a potential difference Ew between the electrode of the object to be measured and the reference electrode is given in Equation (4).

$$Es = E0 + (RT/nF)\log Cs \quad (2)$$

$$ERef = E0 + (RT/nF)\log CRef \quad (3)$$

$$Ew = Es - ERef = (RT/nF)\log(Cs/CRef) \quad (4)$$

FIG. 18 is a diagram showing a configuration of the related-art electrolyte measurement system 1*g*.

With reference to FIG. 18, the measurement by the related-art electrolyte measurement system 1*g* is described.

The electrolyte measurement system 1*g* includes a pre-dispensing heating device 301, a deaerator 100*g*, a vacuum pump 201, a standard solution container 311, a diluting solution container 321, and a control solution container 331. The electrolyte measurement system 1*g* includes a standard solution feeding device 312 and a standard solution nozzle 313. The electrolyte measurement system 1*g* further includes a diluting solution feeding device 322 and a diluting solution nozzle 323. The electrolyte measurement system 1*g* also includes a heating device heat source 302, a suction nozzle 354, an ISE electrode 351, a control electrode 352, a differential voltage calculation device 355, and a processing device 400. The electrolyte measurement system 1*g* includes a specimen dispensing device 342 that performs dispensing from a specimen container 341 and a dilution tank 380. Furthermore, the electrolyte measurement system 1*g* includes a waste solution suction nozzle 376, a vacuum waste solution container 371, a vacuum pump 372 for waste solution, and an after-potential-measurement waste solution container 362.

The pre-dispensing heating device 301 is constantly maintained at a desired temperature by the heating device heat source 302. The desired temperature is, for example, ideally 37 degrees Celsius and practically 37±0.2 degrees Celsius in electrolyte measurement for clinical examinations.

In the deaerator 100*g*, the inside of the container of the deaerator 100*g* is depressurized by the vacuum pump 201 which is an exhaust mechanism, and the solution passing through a hollow fiber provided inside the deaerator 100*g* is separated into gas and liquid. The specimen container 341 holds serum or urine which is the specimen. Practically, the standard solution container 311, the diluting solution container 321, and the control solution container 331 are stored under an environmental temperature. Here, the environmental temperature is usually 18 degrees Celsius to 32 degrees Celsius.

The standard solution is dispensed from the standard solution nozzle 313 to the dilution tank 380 by the standard solution feeding device 312 via a first two-way solenoid valve 314*a* for standard solution and a second two-way solenoid valve 314*b* for standard solution. In this case, by the pre-dispensing heating device 301 provided between the standard solution feeding device 312 and the dilution tank 380, the standard solution is heated to the same temperature as a constant temperature solution (not shown) circulating in the pre-dispensing heating device 301.

The serum and urine held in the specimen container 341 are dispensed into the dilution tank 380 by the specimen dispensing device 342. The diluting solution is used for diluting the serum or urine which is the specimen. The diluting solution is fed to the diluting solution nozzle 323 by the diluting solution feeding device 322 via the deaerator 100*g*, the diluting solution feeding device 322, a first two-way solenoid valve 324*a* for diluting solution, and a second two-way solenoid valve 324*b* for diluting solution. Then, the diluting solution is dispensed into the dilution tank 380 through the diluting solution nozzle 323. In this case, by the pre-dispensing heating device 301 provided between the diluting solution feeding device 322 and the dilution tank 380, the diluting solution is heated to the same temperature as the constant temperature solution (not shown) circulating in the pre-dispensing heating device 301. That is, by circulating the standard solution and the diluting solution in the same pre-dispensing heating device 301, the solution temperature difference between the diluting solution and the standard solution is reduced.

The control solution flows directly into the control electrode 352 via the deaerator 100*g*. The timing at which the control solution flows into the control electrode 352 is adjusted by a two-way solenoid valve 332 for control solution. As to the control solution, since the control solution does not pass through the pre-dispensing heating device 301, the control solution is slightly heated or cooled by an ambient temperature of the flow path through which the control solution passes.

Next, a general procedure of the electrolyte measurement in the electrolyte measurement system 1*g* is described with reference to FIGS. 18 and 19.

Here, FIG. 19 is a flowchart showing the procedure of electrolyte measurement in the related-art electrolyte measurement system 1*g*.

First, the processing device 400 causes a solution feeding device 361 for suction to operate in a state in which a pinch valve 353 is closed while the two-way solenoid valve 332 for control solution, a first two-way solenoid valve 363*a* for waste solution, and a second two-way solenoid valve 363*b* for waste solution are open. As a result, the control solution fills a flow path inside the control electrode 352. That is, the control solution is fed to the control electrode 352 (S101). If the control solution fills the flow path inside the control electrode 352, the processing device 400 closes the two-way solenoid valve 332 for control solution and temporarily stops the solution feeding device 361 for suction.

At the same time as step S101, the processing device 400 causes the standard solution feeding device 312 to operate.

Accordingly, the standard solution is dispensed from the standard solution nozzle 313 into the dilution tank 380 (S102).

Next, the processing device 400 opens the pinch valve 353, the first two-way solenoid valve 363*a* for waste solution, and the second two-way solenoid valve 363*b* for waste solution, and causes the solution feeding device 361 for suction to operate. Accordingly, the standard solution in the dilution tank 380 is suctioned with the suction nozzle 354, and the suctioned standard solution fills the flow path inside the ISE electrode 351. That is, the standard solution is fed to the ISE electrode 351 (S103). If the standard solution fills the flow path inside the ISE electrode 351, the processing device 400 temporarily stops the solution feeding device 361 for suction.

Next, the differential voltage calculation device 355 calculates a potential difference between a potential generated at the ISE electrode 351 and a potential generated at the control electrode 352 (S104). This potential difference is the potential difference of the standard solution. As shown in Equation (4), the potential difference of the standard solution depends on the concentration of the standard solution and the concentration of the control solution. However, the concentration of the standard solution is considered to be constant. The calculated potential difference of the standard solution is transmitted to the processing device 400. The differential voltage calculation device 355 has a built-in amplifier, which amplifies the calculated potential difference and sends the potential difference to the processing device 400.

Next, a waste solution discharge process is performed (S105).

In step S105, the processing device 400 opens the pinch valve 353, the first two-way solenoid valve 363*a* for waste solution, and the second two-way solenoid valve 363*b* for waste solution, and closes the two-way solenoid valve 332 for control solution. The processing device 400 then causes the solution feeding device 361 for suction to operate. Accordingly, the control solution inside the control electrode 352 and the standard solution inside the ISE electrode 351 are discharged as waste solutions through the after-potential-measurement waste solution container 362.

The standard solution remaining in the dilution tank 380 is discharged as waste solution through the vacuum waste solution container 371. In this case, the processing device 400 closes a two-way solenoid valve 375 for waste solution and a two-way solenoid valve 373 for vacuum switching, and opens a two-way solenoid valve 374 for vacuum switching. The processing device 400 then causes a vacuum pump 372 for waste solution to operate. Accordingly, the inside of the vacuum waste solution container 371 is depressurized. Thereafter, the processing device 400 keeps the two-way solenoid valve 375 for waste solution closed, closes the two-way solenoid valve 374 for vacuum switching, and opens the two-way solenoid valve 373 for vacuum switching. Accordingly, the solution (standard solution) remaining in the dilution tank 380 is suctioned from the waste solution suction nozzle 376 and flows into the vacuum waste solution container 371. Thereafter, the processing device 400 opens the two-way solenoid valve 375 for waste solution to discharge the standard solution.

Next, the processing device 400 opens, in the state in which the pinch valve 353 is closed, the two-way solenoid valve 332 for control solution, the first two-way solenoid valve 363*a* for waste solution, and the second two-way solenoid valve 363*b* for waste solution. Thereafter, the processing device 400 causes the solution feeding device 361 for suction to operate. As a result, the control solution fills the flow path inside the control electrode 352. That is, the control solution is fed to the control electrode 352 (S111). If the control solution fills the flow path inside the control electrode 352, the processing device 400 closes the two-way solenoid valve 332 for control solution and temporarily stops the solution feeding device 361 for suction.

At the same time as the process in step 5111, the diluting solution is fed by the diluting solution feeding device 322 to the diluting solution nozzle 323 via the first two-way solenoid valve 324*a* for diluting solution and the second two-way solenoid valve 324*b* for diluting solution. Accordingly, the diluting solution is dispensed from the diluting solution nozzle 323 into the dilution tank 380 (S112).

Further, at the same time as the processes in steps 5111 and 5112, the specimen dispensing device 342 dispenses the specimen such as the serum and urine from the specimen container 341 into the dilution tank 380 (S113). Accordingly, the electrolyte contained in the serum or urine which is the specimen is diluted with the diluting solution dispensed at the same time.

Next, the processing device 400 opens the pinch valve 353, closes the two-way solenoid valve 332 for control solution, and causes the solution feeding device 361 for suction to operate. Accordingly, the diluting solution containing the specimen fills the flow path inside the ISE electrode 351. That is, the diluted specimen is fed to the ISE electrode 351 (S114).

Next, the differential voltage calculation device 355 calculates a potential difference between a potential generated at the ISE electrode 351 and a potential generated at the control electrode 352 (S115). This potential difference is the potential difference of the diluting solution containing the specimen. As shown in Equation (4), the potential difference depends on the concentration of the diluting solution containing the specimen and the concentration of the control solution. Hereinafter, the diluting solution containing the specimen, that is, the specimen diluted with the diluting solution is referred to as a diluted specimen.

Next, the waste solution discharge process is performed (S116).

In step 5116, the processing device 400 opens the pinch valve 353, the first two-way solenoid valve 363*a* for waste solution, and the second two-way solenoid valve 363*b* for waste solution, and closes the two-way solenoid valve 332 for control solution. Thereafter, the processing device 400 causes the solution feeding device 361 for suction to operate. Accordingly, the control solution inside the control electrode 352 and the diluted specimen inside the ISE electrode 351 are discharged as waste solutions through the after-potential-measurement waste solution container 362.

The diluted specimen remaining in the dilution tank 380 is discharged as waste solution through the vacuum waste solution container 371. In this case, the processing device 400 closes the two-way solenoid valve 375 for waste solution and the two-way solenoid valve 373 for vacuum switching, and opens the two-way solenoid valve 374 for vacuum switching. The processing device 400 then causes the vacuum pump 372 for waste solution to operate. Accordingly, the inside of the vacuum waste solution container 371 is depressurized. Thereafter, the processing device 400 keeps the two-way solenoid valve 375 for waste solution closed, closes the two-way solenoid valve 374 for vacuum switching, and opens the two-way solenoid valve 373 for vacuum switching. Accordingly, the solution (diluting solution containing specimen) remaining in the dilution tank 380 flows into the vacuum waste solution container 371. Thereafter, the processing device 400 opens the two-way solenoid valve 375 for waste solution to discharge the diluted specimen.

Thereafter, the processing device 400 analyzes the electrolyte contained in the specimen based on the two measured potential differences (S121).

In the following, the problems of the related-art electrolyte measurement system 1$g$ are described.

First, for convenience, it is assumed that the standard solution and the diluting solution are not heated by the pre-dispensing heating device 301, and the temperatures of the standard solution and the diluting solution are both constant in the environment. That is, it is assumed that the standard solution and the diluting solution are constant in temperature by being heated with the environmental temperature. Regarding the control solution, it is also assumed that the ambient temperature of the flow path through which the control solution passes is the same as the environmental temperature. That is, it is assumed that the temperatures of the standard solution, the diluting solution, and the control solution are the same. Although the specimen is added in the diluting solution, the amount of the specimen is infinitesimal with respect to the amount of the diluting solution, and thus the temperature change of the diluting solution due to the addition of the specimen can be ignored.

Here, C1 is a concentration of the standard solution, C2 is a concentration of the diluted specimen, and Es1 is a potential generated at the ISE electrode 351 when the standard solution is measured. Es2 is a potential generated at the ISE electrode 351 when the diluted specimen is measured, and Ew1 is a potential difference between a potential generated at the ISE electrode 351 when the standard solution is measured and a potential generated at the control electrode 352. Ew2 is a potential difference between a potential generated at the ISE electrode 351 when the diluted specimen is measured and a potential generated at the control electrode 352, and Ew0 is a difference between Ew1 and Ew2. In this case, the following Equations (5), (6), and (7) are satisfied.

$$Es1 = E0 + (RT/nF)\log C1 \quad (5)$$

$$Es2 = E0 + (RT/nF)\log C2 \quad (6)$$

$$Ew1 = Es1 - Eref = (RT/nF)\log(C1/CRef) \quad (7)$$

The following Equation (8) is satisfied, and Equation (9) can be derived. In Equation (9), since C1 is constant, Ew1 is constant. That is, the Ew0 depends only on C2.

$$Ew2 = Es2 - Eref = (RT/nF)\log(C2/CRef) \quad (8)$$

$$Ew0 = Ew1 - Ew2 = (RT/nF)\log(C1/C2) \quad (9)$$

The above is a result based on the assumption that the environmental temperature is all constant. However, in practice, as shown in FIG. 18, the diluting solution and the standard solution are heated by the pre-dispensing heating device 301, while the control solution is influenced by the ambient temperature of the flow path through which the control solution passes. The influence will be examined by the following calculation. Additionally, Es1 and Es2 correspond to the potential Es of the above-described object to be measured, and ERef corresponds to the potential ERef of the above-described reference electrode.

T1 indicates a temperature difference of the diluting solution and standard solution before and after heating caused by the pre-dispensing heating device 301, and T2 indicates a temperature difference of the control solution caused by the ambient temperature of the flow path through which the control solution passes. Tk is the ambient temperature, Ts is a temperature of the solution flowing into the ISE electrode 351, and TRef is a temperature of the solution flowing into the control electrode 352. Accordingly, the following Equations (10) and (11) are satisfied.

$$Ts = Tk + T1 \quad (10)$$

$$TRef = Tk + T2 \quad (11)$$

Thus, if the potential of the ISE electrode 351 is Esk and the potential of the control electrode 352 is ERefk when the influence of the ambient temperature is taken into consideration, the following Equations (12) and (13) are satisfied according to Equations (2) and (3). The potential difference Ewk generated in this case is expressed by Equation (14).

$$Esk = E0 + [\{R(Tk + T1)\}/(nF)]\log Cs \quad (12)$$

$$ERefk = E0 + [\{R(Tk + T2)\}/(nF)]\log CRef \quad (13)$$

$$Ewk = Esk - ERefk = (RTk/nF)\log(Cs/CRef) + (RT1/nF)\log Cs - (RT2/nF)\log CRef \quad (14)$$

As is clear by comparing Equation (14) with Equation (7), Equation (14) has an error term shown in the second and third terms on the right side of Equation (14). This error term leads to measurement errors and causes a decrease in accuracy and precision in the electrolyte measurement.

Methods for solving the above problems are described with reference to FIGS. 1 to 17.

First Embodiment

FIG. 1 is an external diagram of a deaeration system 200 according to the first embodiment. FIG. 2 is an external diagram of a hollow fiber 130 according to the first embodiment, and FIG. 3 is a partial cross-sectional diagram of the hollow fiber 130 according to the first embodiment. FIG. 4 is a side diagram of a deaerator 100 according to the first embodiment, and FIG. 5 is a top diagram of the deaerator 100 according to the first embodiment. FIG. 6 is a side diagram of the deaeration system 200. In addition, FIG. 2 is an enlarged diagram of a reference numeral 150 in FIG. 1.

As shown in FIGS. 1 and 6, the deaeration system 200 includes the deaerator 100 and a vacuum pump 201. A container 110 in the deaerator 100 includes an outer cylinder portion 111 having a bottomed cylindrical shape and a lid portion 112 forming an upper surface, and has a space S inside. As shown in FIGS. 1, 4, 5, and 6, the lid portion 112 has a first inlet 121$a$, a first outlet 121$b$, a second inlet 122$a$, a second outlet 122$b$, and a vacuum pump connection port 125.

As shown in FIG. 1, a plurality of hollow fibers 130 (in the examples in FIGS. 1 to 3, two hollow fibers which are a first hollow fiber 131 and a second hollow fiber 132) are provided inside the deaerator 100.

As shown in FIG. 1, one end of the first hollow fiber 131 of these hollow fibers 130 is connected to the first inlet 121$a$, and the other end of the first hollow fiber 131 is connected to the first outlet 121*b*. One end of the second hollow fiber 132 is connected to the second inlet 122*a*, and the other end of the second hollow fiber 132 is connected to the second outlet 122*b*. One solution circulating from the first inlet 121*a* to the first outlet 121*b* circulates in the first hollow fiber 131. Similarly, another solution circulating from the second inlet 122*a* to the second outlet 122*b* circulates in the second hollow fiber 132.

The first hollow fiber 131 and the second hollow fiber 132 are made of a material that allows gas to pass through but does not allow liquid to pass through, such as ethylene tetrafluoride resin. The first hollow fiber 131 and the second hollow fiber 132 are spirally woven in contact with each other as shown in FIGS. 2 and 3. In this way, the first hollow fiber 131 and the second hollow fiber 132 are spirally woven, so that it is possible to exchange heat between the solution circulating in the first hollow fiber 131 and the solution circulating in the second hollow fiber 132. The first hollow fiber 131 and the second hollow fiber 132 may not be spirally woven as long as the hollow fibers are in contact with each other. However, by spirally weaving the hollow fibers, it is possible to efficiently exchange heat.

As shown in FIGS. 1 and 6, a vacuum pump connection tube 202, of which one end is connected to the vacuum pump 201, is connected to the vacuum pump connection port 125 with the other end. According to such a configuration, the inside of the deaerator 100 is depressurized by the vacuum pump 201. The inside of the deaerator 100 is depressurized to approximately 0 KPa to 15 KPa (preferably 8 KPa) by the vacuum pump 201.

In this way, the inside of the deaerator 100 is depressurized by the vacuum pump 201, so that the gas (dissolved gas) dissolved in the solutions circulating in the first hollow fiber 131 and the second hollow fiber 132 permeates the hollow fiber wall and diffuses inside the deaerator 100. Accordingly, it is possible to deaerate the solutions circulating in the first hollow fiber 131 and the second hollow fiber 132.

In other words, according to the deaerator 100 shown in FIGS. 1 to 6, without increasing the size of the deaerator 100, it is possible to simultaneously perform deaeration of a plurality of liquids circulating inside the first hollow fiber 131 and the second hollow fiber 132 and achieve thermal equilibrium by heat exchange.

In consideration of the function of such a deaerator 100, the lengths of the first hollow fiber 131 and the second hollow fiber 132 in the deaerator 100 are longer than the length for deaerating the gas in the solutions circulating in the first hollow fiber 131 and the second hollow fiber 132. The length of the part where the first hollow fiber 131 and the second hollow fiber 132 are in contact with each other is longer than a length for effectively exchanging the heat in the solutions circulating in the first hollow fiber 131 and the second hollow fiber 132 to reach the thermal equilibrium state. The lengths of the first hollow fiber 131 and the second hollow fiber 132 are preferably at least 0.5 m.

When the vacuum pump 201 is driven, the inside of the deaerator 100 is depressurized, and the outer cylinder portion 111 may be thus significantly deformed. In this case, creep rupture may occur in the outer cylinder portion 111 due to the deformation of the outer cylinder portion 111 over time. Thus, if the molding material of the outer cylinder portion 111 has a tensile elastic modulus of 10 [Gpa] to 30 [Gpa], the deformation over time can be prevented.

As shown in FIGS. 2 and 3, the surfaces of the first hollow fiber 131 and the second hollow fiber 132 are pleated (uneven). According to such a configuration, the surface areas of the first hollow fiber 131 and the second hollow fiber 132 becomes larger, and the amount of permeated gas increases. That is, efficient deaeration is possible. Further, the surfaces of the first hollow fiber 131 and the second hollow fiber 132 are pleated, so that the area where the first hollow fiber 131 and the second hollow fiber 132 are in contact with each other is increased. Accordingly, an efficient heat exchange is achieved between the first hollow fiber 131 and the second hollow fiber 132.

In the examples shown in FIGS. 2 and 3, the surfaces of the first hollow fiber 131 and the second hollow fiber 132 are pleated, so that the surfaces of the first hollow fiber 131 and the second hollow fiber 132 are formed with unevenness. However, the invention is not limited to thereto, and by providing protrusions on the surfaces of the first hollow fiber 131 and the second hollow fiber 132, it is possible to form the surfaces of the first hollow fiber 131 and the second hollow fiber 132 with the unevenness.

In the drawings shown in FIGS. 1 and 4 to 6, the vacuum pump connection port 125 is provided in the center, but is not limited to being provided in the center. The arrangements of the first inlet 121*a*, the first outlet 121*b*, the second inlet 122*a*, and the second outlet 122*b* may not be the arrangements shown in FIGS. 1 and 5. That is, the first inlet 121*a*, the first outlet 121*b*, the second inlet 122*a*, and the second outlet 122*b* may not be symmetrically arranged as shown in FIGS. 1 and 5.

FIG. 7 is a diagram showing a method of mounting the hollow fiber 130 into the deaerator 100.

As shown in FIG. 7, the hollow fiber 130 obtained by bundling together a plurality of hollow fibers 130 (two hollow fibers in the example in FIG. 7) is folded multiple times, and then is housed in a bag 140. Then, the bag 140 housing the hollow fiber 130 is further housed in the outer cylinder portion 111. Although whether the deaeration performance decreases depends on the material and the thickness of the hollow fiber 130, if the plurality of hollow fibers 130 are bundled such that a width (reference numeral 142) of the bent part at the time of bundling is approximately 3 cm, the deaeration performance does not decrease in the process of solution feeding. That is, the flow path resistance can be largely reduced. When the hollow fibers 130 are bundled, as shown in FIG. 7, a string 141 may be used, or the hollow fibers 130 may be directly housed in the bag 140 in the state of being bent. It is desirable that the bag 140 that houses the hollow fiber 130 has meshes so as not to damage the deaeration function.

(Modification)

FIG. 8 is a diagram showing a modification of the deaerator 100.

In the examples shown in FIGS. 1, 4 and 6, injection molding or blow molding has been performed, and the outer cylinder portion 111 of the cylinder is processed to have a shape with an integrated bottom portion, that is, a bottomed cylindrical shape. However, the invention is not limited to thereto, and the outer cylinder portion 111*a* may be a straight tube such as a rigid polyvinyl chloride tube, and the bottom portion 113 may be a separate part. That is, as shown in FIG. 8, a deaerator 100*a* including a separate bottom lid is provided. The outer cylinder portion 111, the lid portion 112, and the bottom portion 113 that have been integrated by ultrasonic welding in order to maintain vacuum airtightness may be telescopic.

Second Embodiment

FIG. 9 is a diagram showing a deaerator 100*b* according to a second embodiment.

As to the deaerator 100*b* shown in FIG. 9, similar to FIG. 8, the bottom portion 113 is a separate part, the first inlet 121*a* and the second inlet 122*a* are formed at the lid portion 112, and the first outlet 121*b* and the second outlet 122*b* are formed at the bottom portion 113. That is, the first inlet 121*a* and the second inlet 122*a* are formed on different surfaces from the first outlet 121*b* and the second outlet 122*b*. In the example shown in FIG. 9, the bottom portion 113 is a separate part. However, as in FIGS. 1, 4 and 6, even in the case in which the bottom portion 113 and the outer cylinder portion 111 are integrated, that is, in the case in which the outer cylinder portion 111 has the bottomed cylindrical shape, the first outlet 121*b* and the second outlet 122*b* may be formed at the bottom portion. The first inlet 121*a* and the first outlet 121*b* may be formed at the lid portion 112, and the second inlet 122*a* and the second outlet 122*b* may be formed at the bottom portion. That is, the first inlet 121*a*, the first outlet 121*b*, the second inlet 122*a*, and the second outlet 122*b* may be formed on any surface of the deaerator 100. In this way, it is possible to increase the degree of freedom in the arrangement of the flow path in an electrolyte measurement system 1 to be described later with reference to FIG. 15 and the like.

Third Embodiment

FIG. 10 is a diagram showing a hollow fiber 130*c* according to a third embodiment.

In the example shown in FIG. 10, hollow fibers 130*c* having different thicknesses are used. That is, a first hollow fiber 131*c*, which is a thick hollow fiber 130*c*, and a second hollow fiber 132, which is a thin hollow fiber 130*c*, are spirally in contact with each other. According to such a configuration, it is possible to achieve the same temperature even when the solution circulating in the first hollow fiber 131*c* and the solution circulating in the second hollow fiber 132 have different feeding amount and specific heat.

In the example shown in FIG. 10, the lengths of the first hollow fiber 131*c* and the second hollow fiber 132 are also different. In this way, it is possible to achieve the same temperature in the solutions even when the solution circulating in the first hollow fiber 131*c* and the solution circulating in the second hollow fiber 132 have different feeding amount and specific heat. In the example shown in FIG. 10, the thickness of the first hollow fiber 131*c* and the thickness of the second hollow fiber 132 are different, but the lengths of the first hollow fiber 131 and the second hollow fiber 132 that have the same thickness may be different. In this way, it is possible to achieve the same temperature in the solutions even when the solution circulating in the first hollow fiber 131 and the solution circulating in the second hollow fiber 132 have different feeding amount and specific heat. Without increasing the size of the deaerator 100, it is possible to deaerate a plurality of liquids.

Fourth Embodiment

FIG. 11 is a partial cross-sectional diagram cutting out a part of a deaerator 100*d* according to a fourth embodiment. FIG. 12 is a top diagram of the deaerator 100*d* according to the fourth embodiment. FIG. 13 is a diagram showing a hollow fiber 130*d* in the deaerator 100*d*. In addition, FIG. 13 is an enlarged diagram of a reference numeral 150*a* in FIG. 11.

FIGS. 11 to 13 show the deaerator 100*d* in which three solutions circulate. That is, as shown in FIGS. 11 and 12, the lid portion 112 of the deaerator 100 includes the first inlet 121*a*, the first outlet 121*b*, the second inlet 122*a*, the second outlet 122*b*, a third inlet 123*a*, and a third outlet 123*b*. However, in FIG. 11, the first outlet 121*b* is not shown.

Inside the deaerator 100*d*, three hollow fibers 130*d* (first hollow fiber 131, second hollow fiber 132, and third hollow fiber 133) as shown in FIG. 13 are housed. Different solutions circulate in the first hollow fiber 131, the second hollow fiber 132, and the third hollow fiber 133. One end of the first hollow fiber 131 is connected to the first inlet 121*a*, and the other end of the first hollow fiber 131 is connected to the first outlet 121*b*. Similarly, one end of the second hollow fiber 132 is connected to the second inlet 122*a*, and the other end of the second hollow fiber 132 is connected to the second outlet 122*b*. One end of the third hollow fiber 133 is connected to the third inlet 123*a*, and the other end of the third hollow fiber 133 is connected to the third outlet 123*b*.

The first hollow fiber 131, the second hollow fiber 132, and third hollow fiber 133 are in contact with one another by being spirally woven. The first hollow fiber 131, the second hollow fiber 132, and third hollow fiber 133 may not be spirally woven as long as the hollow fibers are in contact with one another. However, by spirally weaving the hollow fibers, it is possible to efficiently exchange heat. In this way, it is possible to efficiently cause the three different solutions circulating in the first hollow fiber 131, the second hollow fiber 132, and the third hollow fiber 133 to have the same temperature.

The lid portion 112 is formed with a vacuum pump connection port 125 to which a vacuum pump connection tube 202 is connected. Via the vacuum pump connection tube 202, the vacuum pump 201 is connected to the vacuum pump connection port 125. By operating the vacuum pump 201, the inside of the deaerator 100*d* is depressurized by the vacuum pump 201. Accordingly, it is possible to deaerate the solutions circulating in the first hollow fiber 131, the second hollow fiber 132, and the third hollow fiber 133.

Accordingly, without increasing the size of the deaerator 100*d*, it is possible to simultaneously perform deaeration and heat exchange of a plurality of liquids.

Fifth Embodiment

FIG. 14 is an external diagram of a deaeration system 200*e* according to a fifth embodiment.

In the deaeration system 200*e*, a heater 160, which is a temperature control mechanism, is provided around a deaerator 100*e*. Configurations except this are the same as those shown in FIG. 1 and the like, and the description thereof will be thus omitted. By providing the heater 160, it is possible to adjust the temperatures of the solutions circulating in the hollow fibers 130 provided inside the deaerator 100 to a desired temperature. Accordingly, without increasing the size of the deaerator 100, that is, without increasing the size of the deaeration system 200*e*, it is possible to simultaneously perform deaeration and heat exchange of a plurality of liquids and adjust the temperature of the solution to a predetermined temperature.

Sixth Embodiment

FIG. 15 is a diagram showing a configuration example of the electrolyte measurement system 1 according to the sixth embodiment. The electrolyte measurement system 1 shown in FIG. 15 uses a deaerator 100 shown in the present embodiment.

In FIG. 15, the same reference numerals are attached to configurations similar to those in FIG. 18, and the descriptions thereof are omitted.

The difference between the electrolyte measurement system 1 shown in FIG. 15 and the electrolyte measurement system 1*g* shown in FIG. 18 is as follows.

1. The pre-dispensing heating device 301 and the heating device heat source 302 are excluded.
2. Besides the control solution and the diluting solution, the standard solution also circulates in a deaerator 100*c*. That is, a standard solution flow path 315 in which the standard solution circulates, a diluting solution flow path 325 in which the diluting solution circulates, and a control solution flow path 335 in which the control solution circulates are connected to the deaerator 100*c*. Here, the standard solution flow path 315 is a flow path through which the standard solution is fed from the standard solution container 311 to the standard solution nozzle 313, that is, to the dilution tank 380. The diluting solution flow path 325 is a flow path through which the diluting solution is fed from the diluting solution container 321 to the diluting solution nozzle 323, that is, to the dilution tank 380. The control solution flow path 335 is a flow path through which the control solution is fed from the control solution container 331 to the control electrode 352.

Since three solutions circulate, the deaerator 100*c* shown in FIGS. 11 to 13 is used.

Other configurations are the same as those of the electrolyte measurement system 1*g* shown in FIG. 18.

In the electrolyte measurement executed by the electrolyte measurement system 1, deaeration of the control solution and the diluting solution is essential. It is essential that the standard solution and the diluting solution have the same temperature, and the temperature of the control solution needs to be constant. In addition, although the specimen is mixed with the diluting solution, the amount of the specimen is infinitesimal with respect to the amount of the diluting solution, and thus it can be considered that the temperature of the diluting solution does not change. That is, it is not essential to deaerate the standard solution, and it is not essential to cause the control solution, the standard solution, and the diluting solution to have the same temperature. However, there is no problem even if the standard solution is deaerated, and there is no problem even if the control solution, the standard solution, and the diluting solution have the same temperature. Thus, there is no problem in circulating the control solution, the standard solution, and the diluting solution in the deaerator 100*c*. By circulating the control solution, the standard solution, and the diluting solution in the deaerator 100*c*, it is possible to exclude the pre-dispensing heating device 301 and the heating device heat source 302. Without increasing the size of the deaerator 100*c*, that is, without increasing the size of the electrolyte measurement system 1, by simultaneously performing deaeration and heat exchange of a plurality of liquids, it is possible to reduce the size of the electrolyte measurement system 1 shown in FIG. 15.

Seventh Embodiment

FIG. 16 is a diagram showing a configuration example of an electrolyte measurement system if according to the seventh embodiment.

In the electrolyte measurement system if shown in FIG. 16, the standard solution and the diluting solution are the same reagent. The reagent in which the standard solution and the standard solution are the same in FIG. 16 is referred to as a standard and diluting solution. For example, if the standard solution contains a buffer solution such as triethanolamine as a main component, and contains sodium ions of 4.0 mmol/L to 5.0 mmol/L, potassium ions of 0.1 mmol/L to 0.2 mmol/L, and chloride ions of 3.0 mmol/L to 4.0 mmol/L, even the standard solution and the diluting solution have the same components, the potential difference can be measured.

In the electrolyte measurement system if shown in FIG. 16, a standard and diluting solution container 391 is provided instead of the standard solution container 311 and the diluting solution container 321. In the electrolyte measurement system 1*f*, a standard and diluting solution feeding device 392 is provided instead of the standard solution feeding device 312 and the diluting solution feeding device 322. Further, in the electrolyte measurement system 1*f*, a standard and diluting solution nozzle 393 is provided instead of the standard solution nozzle 313 and the diluting solution nozzle 323. In the electrolyte measurement system 1*f*, a first two-way solenoid valve 394*a* for standard and diluting solution is provided instead of the first two-way solenoid valve 314*a* for standard solution and the first two-way solenoid valve 324*a* for diluting solution. In the electrolyte measurement system 1*f*, a second two-way solenoid valve 394*b* for standard and diluting solution is provided instead of the second two-way solenoid valve 314*b* for standard solution for standard solution and the second two-way solenoid valve 324*b* for diluting solution.

The deaerator 100 is connected to a standard and diluting solution flow path 395 in which the standard and diluting solution circulates and a control solution flow path 335 in which the control solution circulates. Here, the standard and diluting solution flow path 395 is a flow path through which the standard and diluting solution is fed from the standard and diluting solution container 391 to the standard and diluting solution nozzle 393, that is, to the dilution tank 380.

In the electrolyte measurement system if shown in FIG. 16, since the solutions circulating in the deaerator 100 are two solutions which are the standard and diluting solution and the control solution, the deaerators 100, 100*a* and 100*b* shown in FIGS. 1 to 10 are used.

Other configurations are the same as those of the electrolyte measurement system 1 shown in FIG. 15, and the description thereof will be omitted.

According to such a configuration, the number of reagents required for the electrolyte measurement is two, and it is possible to reduce the size of the electrolyte measurement system if as compared with the electrolyte measurement system 1 shown in FIG. 15.

[Processing Device 400]

FIG. 17 is a diagram showing a hardware configuration of a processing device 400 used in the present embodiment.

The processing device 400 is a personal computer (PC) or the like. The processing device 400 includes a memory 401, a central processing unit (CPU) 402, and a storage device 403 such as a hard disk (HD). Further, the processing device 400 includes an input device 404 such as a keyboard and a mouse, a display device 405 such as a display, and a communication device 406 such as a network interface card (NIC).

The program stored in the storage device 403 is loaded into the memory 401 and is executed by the CPU 402. Accordingly, a function for controlling the units of the electrolyte measurement system 1 and a function for analyzing the potential difference obtained by the electrolyte measurement system 1 are embodied.

By using the deaerator 100 shown in the present embodiment, it is possible to simultaneously perform deaeration and heat exchange. It is possible to perform the electrolyte measurement with high accuracy.

Inside the deaerator 100 according to the present embodiment, the hollow fibers 130 are in contact with each other. According to such a configuration, it is possible to efficiently exchange the heat between the solutions in the hollow fibers 130 in contact with each other, and to cause the solutions circulating in the hollow fibers 130 to have the same temperature. Further, due to the spiral shape, the outside of the hollow fibers 130 is half in contact with a vacuum pressure in the deaerator 100, and thus it is possible to effectively separate the solution into gas and liquid.

The effect of causing the solutions circulating in the hollow fibers 130 to have the same temperature is proved using mathematical formulas. Th is the temperature at which the deaerator 100 (100$c$) according to the present embodiment becomes uniform. That is, Equations (10) and (11) become Equations (15) and (16). A potential difference Ewkh generated in this case is given using Equation (17) from Equation (14).

$$Th = Tk + T1 \tag{15}$$

$$Th = Tk + T2 \tag{16}$$

$$Ewkh = (RTh/nF)\log Cs - (RTh/nF)\log Cref = (RTh/nF)\log(Cs/CRef) \tag{17}$$

In Equations (15) and (16), T1=T2.

Here, when Equation (17) and Equation (14) are compared, the error term in Equation (14) is canceled in Equation (17). Thus, it is proved that fluctuation of the potential difference due to the error term does not occur.

In this case, similar as in Equations (5), (6), (7), (8), (9), and (13), Es1$h$ is the potential generated at the ISE electrode 351 when the standard solution is measured, and Es2$h$ is the potential generated at the ISE electrode 351 when the diluted specimen is measured. Similarly, ERefh is the potential generated at the control electrode 352, and Ew1$h$ is the potential difference between the potential generated at the ISE electrode 351 and the potential generated at the control electrode 352 when the standard solution is measured. Ew2$h$ is the potential difference between the potential generated at the ISE electrode 351 and the potential generated at the control electrode 352 when the diluted specimen is measured, and Ew0$h$ is a difference between Ew1$h$ and Ew2$h$. Thus, the ERefh is offset. That is, when equations corresponding to Equations (5) to (9) are calculated by using Equations (17), the following Equations (18-1) to (18-6) are satisfied.

$$Es1h = E0 + (RTh/nF)\log C1 \tag{18-1}$$

$$Es2h = E0 + (RTh/nF)\log C2 \tag{18-2}$$

$$ERefh = E0 + (RTh/nF)\log CRef \tag{18-3}$$

$$Ew1h = Es1h - ERefh \tag{18-4}$$

$$Ew2h = Es2h - ERefh \tag{18-5}$$

$$Ew0h = Ew1h - Ew2h = (RTh/nF)\log(C1/C2) \tag{18-6}$$

According to the present embodiment, by using Equation (18-6) using Th which is a uniform temperature, fluctuations in the potential difference due to the error term can be excluded, and an electrolyte analysis with high accuracy can be achieved.

In the present embodiment, the measurement of blood electrolyte has been described, but the invention is not limited to this field. For example, the deaerator 100 according to the present embodiment can be applied to a chemiluminescent immune device. In the chemiluminescent immune device, a measurement is executed by chemiluminescence of an amount of immune reaction. In this case, a pre-trigger containing hydrogen peroxide as a main component is added to a mixed solution of the specimen and the reagent, and then a trigger containing sodium hydroxide as a main component is added. In this case, by minimizing a temperature difference between the pre-trigger solution and the trigger solution and further deaerating both the solutions, an analysis and measurement with highly accuracy can be achieved. Thus, by circulating a pre-trigger container and a trigger container in the deaerator 100 according to the present embodiment, it is possible to analyze and measure the chemiluminescent immunity.

Even in an immunological item measurement device of immunochemiluminescence, by minimizing a temperature difference between two different types of solutions and deaerating the two types of solutions, the analysis and measurement with highly accuracy can be achieved. Thus, in the immunological item measurement device of immunochemiluminescence, by circulating the two different types of solutions in the deaerator 100 according to the present embodiment, the analysis and measurement with highly accuracy can be achieved.

In the present embodiment, the processing device 400 controls each unit of the electrolyte measurement systems 1 and if and analyzes the electrolyte. However, the invention is not limited thereto, and the control of each unit of the electrolyte measurement systems 1 and if and the analysis of the electrolyte may be executed by different devices.

The invention is not limited to the above-described embodiments, and includes various modifications. For example, the above-described embodiments have been described in detail for easy understanding of the invention, and are not necessarily limited to those having all the described configurations. A part of the configurations according to one embodiment can be replaced with the configurations according to another embodiment, and the configurations according to one embodiment can also be added to the configurations according to another embodiment. A part of the configuration according to each embodiment can be added, deleted, or replaced with other configurations.

The configurations, the functions, the storage device 403, and the like in the above-described processing device 400 may be implemented by hardware, for example, by being designed using an integrated circuit. As shown in FIG. 17, the above-described configurations, functions, and the like may be implemented by software by a processor such as the CPU 402 interpreting and executing a program for implementing the functions. Information of programs, tables, files, and the like for implementing each function can be stored in, in addition to the HD, a recording device such as the memory 401 or a solid state drive (SSD), or a recording medium such as an integrated circuit (IC) card, a secure digital (SD) card, or a digital versatile disc (DVD).

In each embodiment, control lines and information lines considered to be necessary for description are shown, and not all the control lines and information lines are necessarily shown in the product. In practice, almost all the configurations may be considered to be connected to one another.

REFERENCE SIGN LIST

1, if electrolyte measurement system
100, 100*a*, 100*b*, 100*d*, 100*e* deaerator
121*a* first inlet (port on one end side)
121*b* first outlet (port on the other end side)
122*a* second inlet (port on one end side)
122*b* second outlet (port on the other end side)
130, 130*c*, 130*d* hollow fiber
131 first hollow fiber
132 second hollow fiber
133 third hollow fiber
200 deaeration system
201 vacuum pump (exhaust mechanism)
110 container
111, 111*a* outer cylinder portion
112 lid portion (container)
113 bottom portion (container)
160 heater (temperature control mechanism)
311 standard solution container
315 standard solution flow path (first flow path)
321 diluting solution container
325 diluting solution flow path (third flow path)
331 control solution container
335 control solution flow path (fourth flow path)
341 specimen container (sample container)
351 ISE electrode
352 control electrode
355 differential voltage calculation device
380 dilution tank
391 standard and diluting solution container
395 standard and diluting solution flow path (second flow path)
S space

The invention claimed is:

1. An electrolyte measurement system comprising a deaerator, wherein the deaerator includes a first hollow fiber in which a first treatment solution is conducted from a port on one end side to a port on the other end side to cause a gas in the first treatment solution to permeate a membrane, a second hollow fiber in which a second treatment solution is conducted from a port on one end side to a port on the other end side to cause a gas in the second treatment solution to permeate through the membrane, a container, including a lid and a housing, configured to house the first hollow fiber and the second hollow fiber inside, a mesh bag arranged inside the container, wherein the first hollow fiber and the second hollow fiber are disposed inside the mesh bag, and an exhaust mechanism connected to a space in the container, wherein the lid includes a plurality of inlets connected to the first hollow fiber and the second hollow fiber, a plurality of outlets connected to the first hollow fiber and the second hollow fiber, and a vacuum pump connection port connecting the exhaust mechanism to the space in the container, over a certain length, the first hollow fiber and the second hollow fiber are in contact with each other by being spirally woven; and wherein outer surfaces of the first hollow fiber and the second hollow fiber are formed with a pleated surface, and the electrolyte measurement system further comprising: a sample container configured to hold a specimen; a single standard and diluting solution container configured to hold a standard and diluting solution configured for use as both a diluting solution and a standard solution; a control solution container configured to hold a control solution; a dilution tank configured to dilute a sample injected from the sample container with the standard and diluting solution; a control electrode configured to measure a potential of the control solution; an ISE electrode configured to measure a potential of the standard and diluting solution and a potential of the standard and diluting solution with which the specimen is diluted; a differential voltage measurement device configured to calculate a differential potential, which is a difference between the potential measured by the ISE electrode and the potential measured by the control electrode; an analysis device configured to analyze an electrolyte contained in the specimen based on the differential potential calculated by the differential voltage measurement device; a first flow path through which the control solution is fed from the control solution container to the control electrode; a second flow path through which the standard and diluting solution is fed to the dilution tank; and a heater disposed in contact with an outer surface of the housing;

the deaerator including the two hollow fibers connected to the first flow path and the second flow path inside;

wherein the housing has a tensile elastic modulus of 10 Gpa to 30 Gpa;

wherein the housing is an outermost container of the deaerator;

wherein the housing and the heater have cylindrical shapes such that the outer surface of the housing is in contact with an inner surface of the heater.

2. The electrolyte measurement system according to claim 1, wherein in addition to the first hollow fiber and the second hollow fiber, another hollow fiber is further housed inside the container, and the another hollow fiber, the first hollow fiber, and the second hollow fiber are spirally woven with one another.

* * * * *